Figure 1:
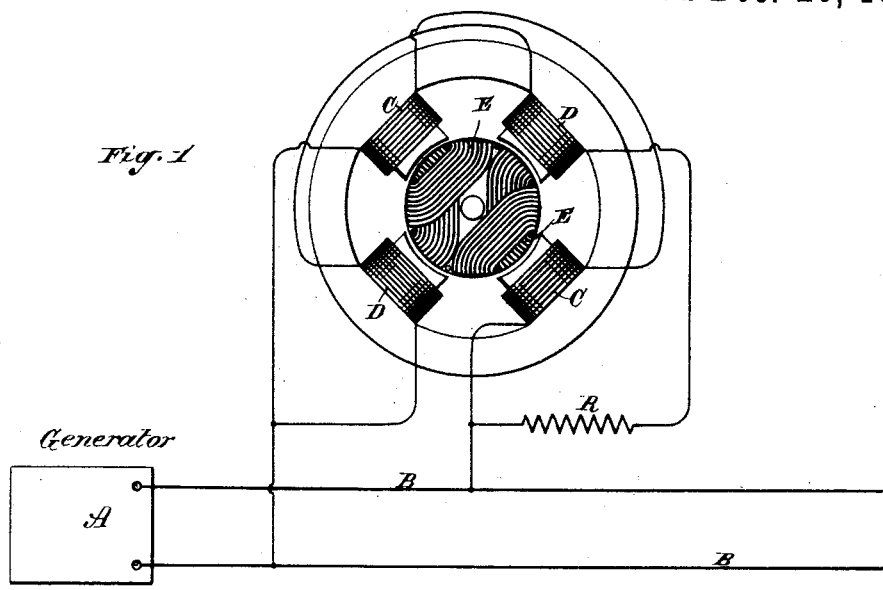

(No Model.)  3 Sheets—Sheet 1.

N. TESLA.
SYSTEM OF ELECTRICAL POWER TRANSMISSION.

No. 511,560.  Patented Dec. 26, 1893.

WITNESSES:
Raphaël Netter
Ernest Hopkinson

INVENTOR
Nikola Tesla
BY
Duncan, Curtis & Page
ATTORNEYS.

(No Model.) 3 Sheets—Sheet 2.
N. TESLA.
SYSTEM OF ELECTRICAL POWER TRANSMISSION.
No. 511,560. Patented Dec. 26, 1893.
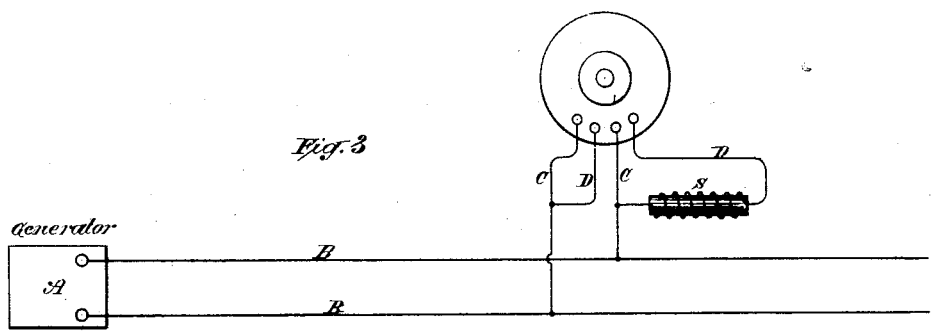
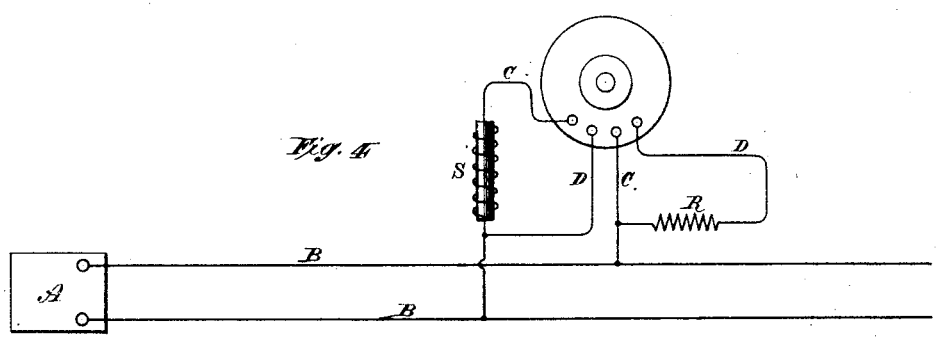
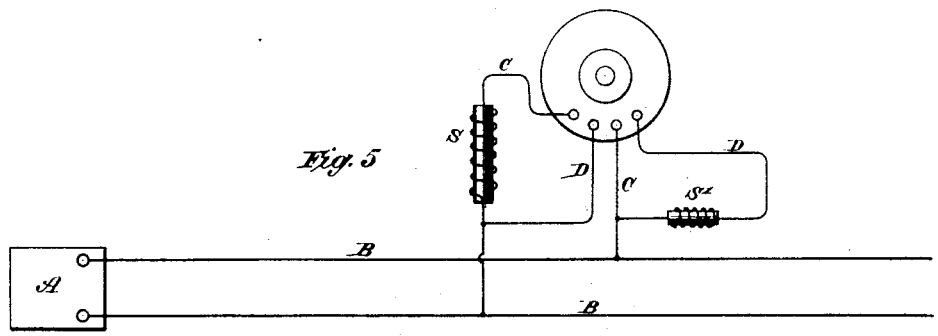
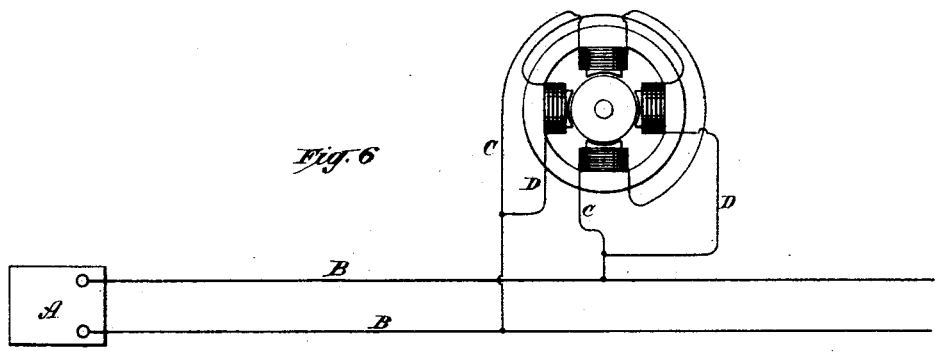
WITNESSES:
Raphael Netter
Ernest Hopkinson
INVENTOR
Nikola Tesla
BY
Duncan, Curtis & Page
ATTORNEYS.

(No Model.) 3 Sheets—Sheet 3.

N. TESLA.
SYSTEM OF ELECTRICAL POWER TRANSMISSION.

No. 511,560. Patented Dec. 26, 1893.

WITNESSES
Raphaël Netter
James H. Cartlow

INVENTOR
Nikola Tesla
BY
Duncan & Page
ATTORNEYS.

UNITED STATES PATENT OFFICE.

NIKOLA TESLA, OF NEW YORK, N. Y., ASSIGNOR TO THE TESLA ELECTRIC COMPANY, OF SAME PLACE.

SYSTEM OF ELECTRICAL POWER TRANSMISSION.

SPECIFICATION forming part of Letters Patent No. 511,560, dated December 26, 1893.

Application filed December 8, 1888. Serial No. 293,052. (No model.)

*To all whom it may concern:*

Be it known that I, NIKOLA TESLA, a subject of the Emperor of Austria-Hungary, from Smiljan, Lika, border country of Austria-Hungary, residing at New York, in the county and State of New York, have invented certain new and useful Improvements in Systems of Electrical Power Transmission, of which the following is a specification, reference being had to the drawings accompanying and forming a part of the same.

In certain patents heretofore granted, I have shown and described a system of electrical power transmission in which each motor contained two or more independent energizing circuits through which were caused to pass alternating currents having in each circuit such difference of phase that by their combined or resultant action they produced a rotary progression of the poles or points of maximum magnetic effect of the motor and thereby maintained the rotation of its movable element. In the system referred to and described in the said patents the production or generation of the alternating currents, upon the combined or resultant effect of which the operation of the system depends, is effected by the employment of an alternating current generator with independent induced circuits which, by reason of the winding or other construction of the generator, produces currents differing in phase, and these currents are conveyed directly from the generator to the corresponding motor coils by independent lines or circuits. I have, however, discovered that I may produce the same or a similar result by an alternating current from a single original source using between the generator and motors but one line or transmission circuit. Broadly stated, this system or method involves a source of alternating or equivalent currents, a single transmission circuit, a motor having independent energizing circuits connected with or adapted for connection with the transmission circuit, means for rendering the magnetic effects due to the energizing circuits of different phase, and an armature within the influence of the energizing circuits; the means for accomplishing this result being of such a nature as to retard the current in one energizing circuit to a greater or less extent than in the other. The distribution of the main or original current through the two motor circuits may be effected by induction or by derivation. In other words, I may pass the alternating current from the source through one energizing circuit, and induce by such current a second current in the other energizing circuit. Or, on the other hand, I may connect up the two energizing circuits of the motor in derivation or multiple arc with the main circuit from the source. In either event I make due provision for maintaining a difference of phase between the currents in the two circuits or branches.

In an application filed by me May 15, 1888, Serial No. 273,993, I have shown and described the means which I have employed for securing this result by inducing one energizing current from the other.

My present application relates to the means employed when the two energizing currents are obtained from a single original source by derivation.

In explanation of what appears to be the principle of the operation of my invention and of the functions of the several instrumentalities comprised thereby, let it be assumed that the two energizing circuits of an alternating current motor, such, for example, as I have described in my Patent No. 382,280, dated May 1, 1888, are connected up in derivation or multiple arc with the conductors of a circuit including an alternating current generator. It is obvious that if both circuits are alike and offer the same resistance to the passage of the current no rotary effect will be produced, for although the periods of the currents in both circuits will lag or be retarded to a certain extent with respect to an unretarded current from the main circuit, their phases will coincide. If, however, the coils of one circuit have a greater number of convolutions around the cores, or a self induction coil be included in one of the circuits, the phases of the current in that circuit are retarded by the increased self induction. The degree of retardation may readily be secured by these means which will produce the difference in electrical phase between the two currents necessary for the practical operation of the motor. If in lieu of increasing the self induction of one circuit a dead resistance be inserted, the self induction of such circuit exerts a correspondingly diminished effect, and the phases of the current flowing in that branch are brought more nearly in unison with those of an unretarded current from the main line and the necessary difference of phase between the currents in the two energizing circuits thus secured. I take advantage of these results in several ways. For example, I may insert variable resistances in both branches or energizing circuits and by varying one or the other so as to bring the phases of the two currents more or less in unison with those of the unretarded current, I may thus vary the direction of the rotation of the motor. In lieu of resistances I may employ variable self induction coils, in both circuits. Or I may use a resistance in one and a self induction coil in the other and vary either or both. This system or means of operating the motors is rendered of great practical value by employing an armature wound with energizing coils closed upon themselves, in which currents are induced by the alternating currents passing in the field coils that serve to greatly increase the mutual attractive effect between the armature and the field magnets. This use of the armature with closed coils I regard as an important feature of my invention. These several features of the invention I shall now describe more in detail by reference to the accompanying drawings.

Figure 2:
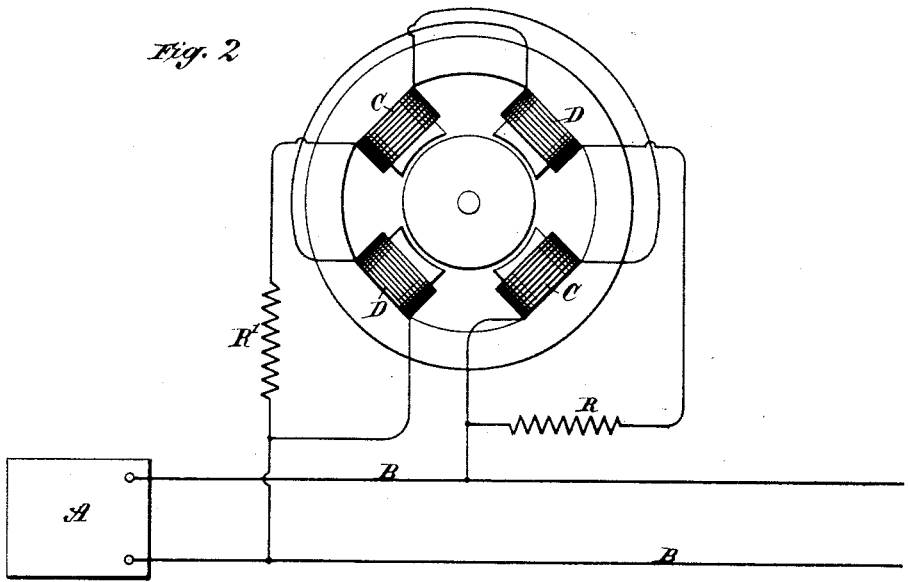
Figure 7:
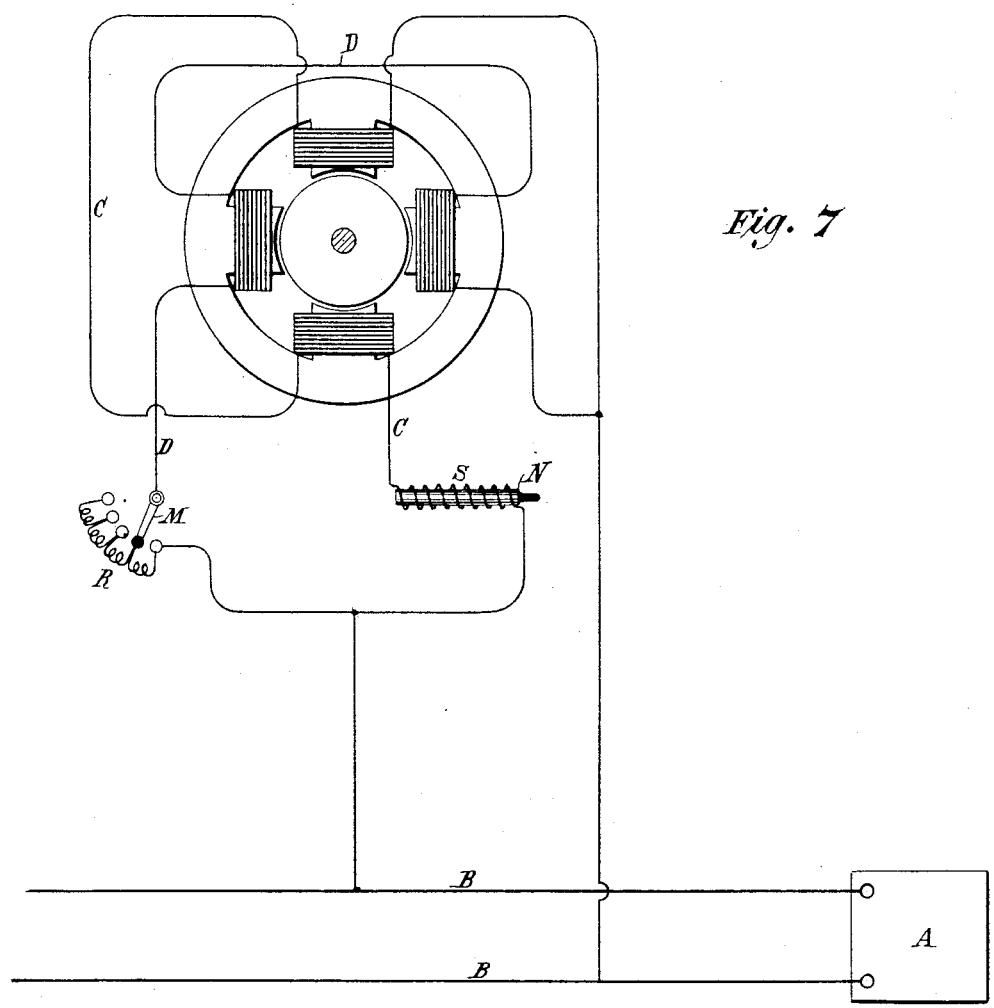

Figure 1 is a diagram of the system in which the motor coils or energizing circuits are in derivation to the main line with a dead resistance inserted in one circuit. Fig. 2 is a diagram showing dead resistances in both motor circuits. Fig. 3 is a diagram showing a self induction coil in one motor circuit. Fig. 4 is a diagram showing a dead resistance in one circuit and a self induction coil in the other. Fig. 5 in like manner shows a self induction coil in each motor circuit. Fig. 6 is a diagram showing the two motor circuits of different electrical character. Fig. 7 is a diagram illustrating means for varying at will the electrical character of the motor circuits.

Referring to Fig. 1, A designates a suitable source of alternating currents and B B the line wires running therefrom. It will be understood that the generator A may be a primary or secondary generator, and the line B B may be the main transmission circuit or a local circuit from a transformer connected at any point in the line of a main or transmission circuit. For convenience in this case, it will be considered as a line from a given source of current to one or more motors. The motor contains a given number of pole pieces wound with two sets of coils C and D. The armature is wound with permanently closed energizing coils E in which currents are developed by inductive action when the motor is in operation which magnetize the armature core and greatly increase the efficiency of the motor. Assuming the two motor circuits to have the same degree of self induction and resistance no rotary effect will be produced by the passage through them of an alternating current from the source A. But if in one of the motor circuits, as D, a dead resistance represented by R be introduced, the self induction of that circuit or branch is reduced and the phases of current therein retarded to a correspondingly less extent. The relative degrees of retardation of the phases of the current in the two motor circuits with respect to those of an unretarded current from the circuit B thus produced will set up a rotation of the motor which may be practically utilized for many purposes.

If, as in Fig. 2, a dead resistance R, R' be introduced into each motor circuit, no rotary effect will be produced as long as the resistances are equal, but by varying the resistance in one circuit the retardation of the current in that circuit will be varied, and corresponding effects produced. For example, a reduction of the resistance in one circuit imparts to the motor rotation in one direction while a reduction of the resistance in the other circuit will produce a rotation in the opposite direction. By means of the two resistances, therefore, capable of variation or of being bodily withdrawn from or inserted in the circuits by any well known means, a perfect regulation of the motors is secured.

In Fig. 3 the arrangement of all the parts is similar to that shown in Fig. 1 except that a self induction coil as S is introduced into one branch or energizing circuit of the motor. The effect of thus increasing the self induction in one of the circuits is to retard the phases of the current passing therein to a greater extent than in the other circuit and in this way to secure the necessary difference in phase between the two energizing currents to produce the rotation of the motor.

In Fig. 4 a self induction coil S is included in one of the motor circuits and a dead resistance R in the other. The increased self induction in one circuit thus produced acts to increase the difference of phase between the current in such motor circuit and the unretarded current in the main line B. On the other hand, the introduction of the dead resistance in the other motor circuit reduces the retardation and brings the phases of the current therein more closely in accord with those of the unretarded current, thus producing a correspondingly greater difference of phase between the two currents in the energizing circuits C and D.

In Fig. 5, two self induction coils S, S' are shown, one in each motor or energizing circuit. One of these coils as S' is much smaller than the other and has less self induction or counter electro motive force than the other, so that the phases of current will be retarded to a less extent than in the other. The two self induction coils may be of the same character or size if it is desired to use but one at a time for the purpose of reversing the motor, or if they be constructed in well known ways so that they may be varied.

In Fig. 7 the usual means for varying the resistance or self-induction of the motor circuits at will are indicated by the lever M sliding over a series of resistance plates, and by a core N which is adapted to be moved in and out of the induction coil S.

Similar results may be secured by such a construction or organization of the motor as will yield the necessary differences of phase. For example, one set of energizing coils may be of finer wire than the other, or have a greater number of convolutions, or each circuit may contain the same number of convolutions, but composed of different conductors, as, for instance, one of copper, the other of German silver. I have represented this in Fig. 6, in which the coils C are indicated by closer lines than coils D.

There are other ways of varying the retardation due to the self induction in the two energizing circuits. For example, the motor coils may be all alike, but those of one energizing circuit connected in parallel while the others are connected in series, or the connection in each energizing circuit may be alike, but the currents directed through them may be of different strength, as when one of the currents is supplied from a source of higher electro-motive force.

In the above description I have referred mainly to motors with two energizing circuits, but it is evident that the invention applies equally to those in which there are more than two of such circuits, the adaptation of the same being a matter well understood by those skilled in the art.

In using in the claims the term active resistance as applied to the motor circuits in this case, it will be understood that the term refers to the opposing or retarding force existing in the circuits to the passage of the alternating currents. Thus, the two circuits may have the same dead resistance, but different degrees of self induction.

What I claim as my invention is—

1. The combination with a source of alternating currents, and a circuit from the same, of a motor having independent energizing circuits connected with the said circuit, and means for rendering the magnetic effects due to said energizing circuits of different phase and an armature within the influence of said energizing circuits.

2. The combination with a source of alternating currents and a circuit from the same, of a motor having independent energizing circuits connected in derivation or multiple arc with the said circuit, the motor or energizing circuits being of different electrical character whereby the alternating currents therein will have a difference of phase, as set forth.

3. The combination with a source of alternating currents and a circuit from the same, of a motor having independent energizing circuits connected in derivation or multiple arc with the said circuit and of different active resistance, as set forth.

4. In an alternating current motor, the combination with field magnets, of independent energizing circuits, adapted to be connected in multiple arc with the conductors of the line or transmission circuit and a resistance or self induction coil in one or both of the said motor circuits, as set forth.

5. In an alternating current motor, the combination with the field magnets or cores of independent energizing coils adapted to be connected in multiple arc with the line or transmission circuit, and a variable resistance or self induction coil included in one or both of the motor circuits as set forth.

6. In an alternating current motor, the combination with the field magnets or cores and independent energizing circuits of different active resistance and adapted to be connected with the line or transmission circuit, of an armature wound with closed energizing coils or conductors, as set forth.

7. The combination of a generator of alternating currents, a pair of mains connected thereto, a multiple circuit differential phase, and an electric motor having one circuit connected directly to said mains, and the other circuit connected to said mains through an interposed electro-motive phase-changing device adapted to change the time period of the currents passing through it.

NIKOLA TESLA.

Witnesses:
FRANK E. HARTLEY,
FRANK B. MURPHY.

It is hereby certified that in Letters Patent No. 511,560, granted December 26, 1893, upon the application of Nikola Tesla, of New York, N. Y., for an improvement in "Systems of Electrical Power Transmission," an error appears in the printed specification requiring correction, as follows: In line 95, page 3, the words "and an" should be stricken out; and that the said Letters Patent should be read with this correction therein that the same may conform to the record of the case in the Patent Office.

Signed and sealed this 9th day of June, A. D., 1903.

[SEAL.]

F. I. ALLEN,
*Commissioner of Patents.*